(12) United States Patent
Lee et al.

(10) Patent No.: US 8,950,467 B2
(45) Date of Patent: Feb. 10, 2015

(54) SEAT-AIR CONDITIONING SYSTEM FOR AUTOMOTIVE VEHICLES

(75) Inventors: Dae Woong Lee, Daejeon (KR); Jong Su Kim, Daejeon (KR); Soo-Yong Jin, Daejeon (KR)

(73) Assignee: Halla Visteon Climate Control Corporation, Daejeon (KR)

( * ) Notice: Subject to any disclaimer, the term of this patent is extended or adjusted under 35 U.S.C. 154(b) by 1214 days.

(21) Appl. No.: 12/797,603

(22) Filed: Jun. 9, 2010

(65) Prior Publication Data
US 2010/0314071 A1    Dec. 16, 2010

(30) Foreign Application Priority Data

Jun. 10, 2009  (KR) .................. 10-2009-0051640
Jul. 31, 2009  (KR) .................. 10-2009-0070855

(51) Int. Cl.
  *B60H 1/00*   (2006.01)
  *B60H 3/00*   (2006.01)
  *B60N 2/56*   (2006.01)

(52) U.S. Cl.
  CPC .......... *B60N 2/5628* (2013.01); *B60H 1/00285* (2013.01); *B60N 2/5657* (2013.01); *B60H 2001/003* (2013.01); *Y10S 454/907* (2013.01)
  USPC .............. 165/42; 165/43; 165/203; 165/204; 237/12.3 A; 454/120; 454/907; 62/244; 62/261; 297/180.13; 297/80.14

(58) Field of Classification Search
  USPC ......... 165/42, 43, 203, 204, 202; 237/12.3 A; 454/120, 907; 62/244, 261; 297/180.13, 180.14
  See application file for complete search history.

(56) References Cited

U.S. PATENT DOCUMENTS 5,921,100 A  *  7/1999  Yoshinori et al. .............. 165/43
6,478,369 B1 * 11/2002  Aoki et al. .............. 297/180.13

FOREIGN PATENT DOCUMENTS

| JP | 07025224 A | * | 1/1995 |
| JP | 2001171333 A | * | 6/2001 |
| JP | 2004-161059 A | | 6/2004 |
| JP | 2004-161061 A | | 6/2004 |

* cited by examiner

*Primary Examiner* — John Ford
(74) *Attorney, Agent, or Firm* — Patent Law Group LLP

(57) ABSTRACT

A seat air-conditioning system for automotive vehicles includes an air-conditioning unit for generating cold air or hot air, a driver seat including a seat portion provided with a plurality of air discharge holes through which to discharge the cold air or the hot air to the outside, a front passenger seat including a seat portion provided with a plurality of air discharge holes through which to discharge the cold air or the hot air to the outside, an outlet duct mounted to the air-conditioning unit for drawing the cold air or the hot air from the air-conditioning unit therethrough, a seat duct connected to the outlet duct for supplying the cold air or the hot air to the driver seat and the front passenger seat therethrough, and a seat blower attached to the outlet duct for blowing the cold air or the hot air at an increased flow rate.

7 Claims, 15 Drawing Sheets

SEAT-AIR CONDITIONING SYSTEM FOR AUTOMOTIVE VEHICLES

FIELD OF THE DISCLOSURE

The present invention relates to a seat air conditioning system for automotive vehicles and, more particularly, to a seat air-conditioning system for automotive vehicles capable of improving the cooling or heating performance for a driver seat and a front passenger seat.

BACKGROUND OF THE DISCLOSURE

Recently available air-conditioning systems for automotive vehicles are provided with various kinds of convenience devices for enhancing the pleasantness within a vehicle room. For example, there are known a console air-conditioning system for cooling or heating a console box and a seat air-conditioning system for cooling or heating a driver seat and a front passenger seat.

As shown in FIG. 1, the console air-conditioning system is configured to supply a cold air or a hot air generated in an air-conditioning unit 3 to a console box 1. This makes it possible for the console box 1 to serve as a refrigerator or a heating cabinet.

The seat air-conditioning system is designed to feed a cold air or a hot air generated in the air-conditioning unit 3 to a plurality of air discharge holes 8 formed in the seat portions 5a and 7a of a driver seat 5 and a front passenger seat 7. Thus, the cold air or the hot air is discharged from the air discharge holes 8 of the seat portions 5a and 7a. This makes it possible to cool the driver seat and the front passenger seat in summer, while warming them in winter.

The cold air or the hot air supplied from the air-conditioning unit 3 to the seat portions 5a and 7a is fed to the air discharge holes 8 of the seat portions 5a and 7a through different ducts D which are branched from a console duct 1a leading to the console box 1.

However, the conventional seat air-conditioning system set forth above suffers from shortage in the flow rate of the cold air or the hot air, because it makes use of a part of the cold air or the hot air drawn from the console duct 1a. This leads to a reduction in the capability of cooling or heating the seat portions 5a and 7a.

In view of this, there have been proposed techniques in which the capability of cooling or heating the seat portions 5a and 7a is improved by increasing the flow rate of the cold air or the hot air supplied to the seat portions 5a and 7a.

One example of these techniques is disclosed in JP2004-161061A. As shown in FIG. 2, this technique is directed to a configuration in which an auxiliary blower 3b is arranged in an air-conditioning case 3a of an air-conditioning unit 3. The auxiliary blower 3b is integrally mounted to the air-conditioning case 3a and is used to increase the quantity and pressure of a cold air or a hot air fed to a console duct 1a. This makes it possible to increase the flow rate of the cold air or the hot air supplied to the seat portions 5a and 7a of a driver seat 5 and a front passenger seat 7, thereby enhancing the cooling or heating performance for the seat portions 5a and 7a.

Since the auxiliary blower 3b is integrally mounted to the air-conditioning unit 3, the above-cited conventional technique poses a problem in that the air-conditioning unit 3 becomes structurally complicated, costly to manufacture and difficult to fabricate.

In particular, a blower chamber 3c for accommodating the auxiliary blower 3b needs to be formed in the air-conditioning case 3a. It is also necessary to provide an air passage 3d kept in communication with the blower chamber 3c. In addition, there is a need to install a variety of doors 3e along the air passage 3d. This results in a highly complicated configuration and requires doing a difficult task when assembling different parts together.

Inasmuch as the auxiliary blower 3b is integrally mounted to the air-conditioning unit 3, the conventional technique has a drawback in that the air-conditioning unit 3 cannot be interchanged with an air-conditioning unit having no auxiliary blower, namely an air-conditioning unit having no need to cool or warm seat portions nor to increase the flow rate of a cold air or a hot air.

This means that, in case of an air-conditioning system with no function of cooling or heating seats, there is a need to additionally manufacture an air-conditioning unit having no auxiliary blower. This results in a sharp increase in the manufacturing cost.

In addition, the conventional technique has a disadvantage in that the flow rate of the cold air or the hot air supplied to the seat portions 5a and 7a is insufficient because the cold air or the hot air supplied to the seat portions 5a and 7a is diverted from the console duct 1a. This reduces the capability of cooling or warming the driver seat 5 and the front passenger seat 7.

SUMMARY OF THE DISCLOSURE

In view of the above-noted problems, it is an object of the present invention to provide a seat air-conditioning system for automotive vehicles, which is less costly to manufacture and can be mounted in position through a simplified assembling process.

Another object of the present invention is to provide a seat air-conditioning system for automotive vehicles, which includes one kind of air-conditioning unit interchangeably usable with both an air-conditioning system having a seat cooling or heating function and an air-conditioning system having no seat cooling or heating function.

A further object of the present invention is to provide a seat air-conditioning system for automotive vehicles, which can increase the shared use ratio of parts between different air-conditioning systems and can eventually provide a cost saving effect.

A still further object of the present invention is to provide a seat air-conditioning system for automotive vehicles, which can supply a cold air or a hot air to vehicle seats at an increased flow rate and can remarkably increase the seat cooling or heating performance.

In order to accomplish the above objects, the present invention provides a seat air-conditioning system for automotive vehicles, including:

an air-conditioning unit for generating a cold air or a hot air;

a driver seat including a seat portion provided with a plurality of air discharge holes through which to discharge the cold air or the hot air to the outside;

a front passenger seat including a seat portion provided with a plurality of air discharge holes through which to discharge the cold air or the hot air to the outside;

an outlet duct mounted to the air-conditioning unit for drawing the cold air or the hot air from the air-conditioning unit therethrough;

a seat duct connected to the outlet duct for supplying the cold air or the hot air to the driver seat and the front passenger seat therethrough; and a seat blower attached to the outlet duct for blowing the cold air or the hot air at an increased flow rate.

With the seat air-conditioning system of the present invention, the cold air or the hot air is drawn from the air-conditioning unit through the outlet duct additionally installed in the air-conditioning case. The seat portions are cooled or heated by the cold air or the hot air thus drawn. This helps simplify the assembling structure of the seat air-conditioning system. Accordingly, it becomes possible to fabricate the seat air-conditioning system through a simplified assembling process and in a cost-effective manner.

The seat portions are cooled or heated by the cold air or the hot air drawn through the outlet duct additionally installed in the air-conditioning case. Unlike the prior art, it is not required that various kinds of devices for cooling or heating the seat portions be installed within the air-conditioning unit.

This makes it possible to fabricate the air-conditioning case for an air-conditioning system having a seat cooling or heating function in the same structure as the air-conditioning case for an air-conditioning system having no seat cooling or heating function. Therefore, the air-conditioning case for an air-conditioning system having a seat cooling or heating function can be interchangeably used with the air-conditioning case for an air-conditioning system having no seat cooling or heating function. As a result, it is possible to increase the shared use ratio of parts between different air-conditioning systems, eventually providing a cost saving effect.

In the seat air-conditioning system of the present invention, the flow rate of the cold air or the hot air supplied to the seat portions is increased by use of the seat blower mounted to the outlet duct. Unlike the prior art, it is not required that an auxiliary blower for increasing the flow rate of the cold air or the hot air be integrally installed within the air-conditioning unit.

This makes it possible to fabricate the air-conditioning case for an air-conditioning system having a seat cooling or heating function in the same structure as the air-conditioning case for an air-conditioning system having no seat cooling or heating function. Therefore, the air-conditioning case for an air-conditioning system having a seat cooling or heating function can be interchangeably used with the air-conditioning case for an air-conditioning system having no seat cooling or heating function. As a result, it is possible to increase the shared use ratio of parts between different air-conditioning systems, eventually providing a cost saving effect.

In the seat air-conditioning system of the present invention, the cold air or the hot air is directly fed to the driver seat and the front passenger seat, which makes it possible to supply the cold air or the hot air to the driver seat and the front passenger seat at an increased flow rate. Accordingly, there is provided an effect of sharply increasing the seat cooling or heating performance.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Figure 1:
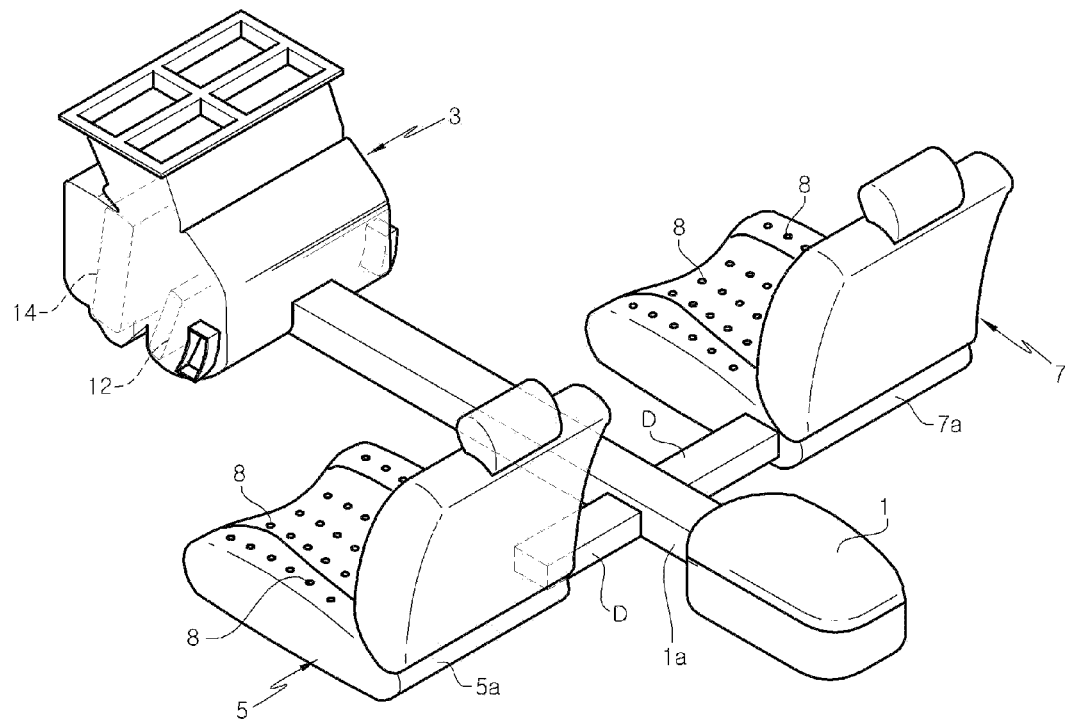
FIGS. 1 and 2 are perspective and section views illustrating a conventional seat air-conditioning system for automotive vehicles.

Certain preferred embodiments of a seat air-conditioning system for automotive vehicles in accordance with the present invention will now be described in detail with reference to the accompanying drawings. The same reference numerals as used in describing the prior art will be used to designate the same elements.

First Embodiment

Figure 3:
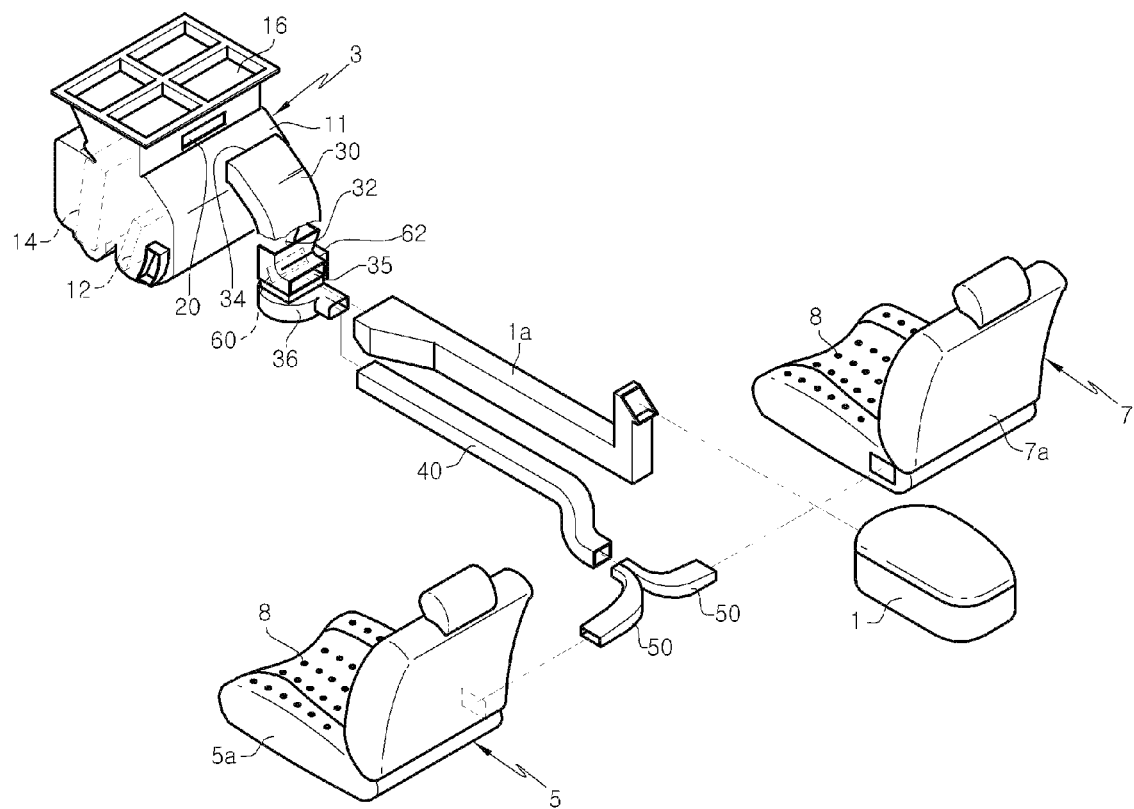
FIG. 3 is an exploded perspective view showing a seat air-conditioning system for automotive vehicles in accordance with a first embodiment of the present invention.
Figure 4:
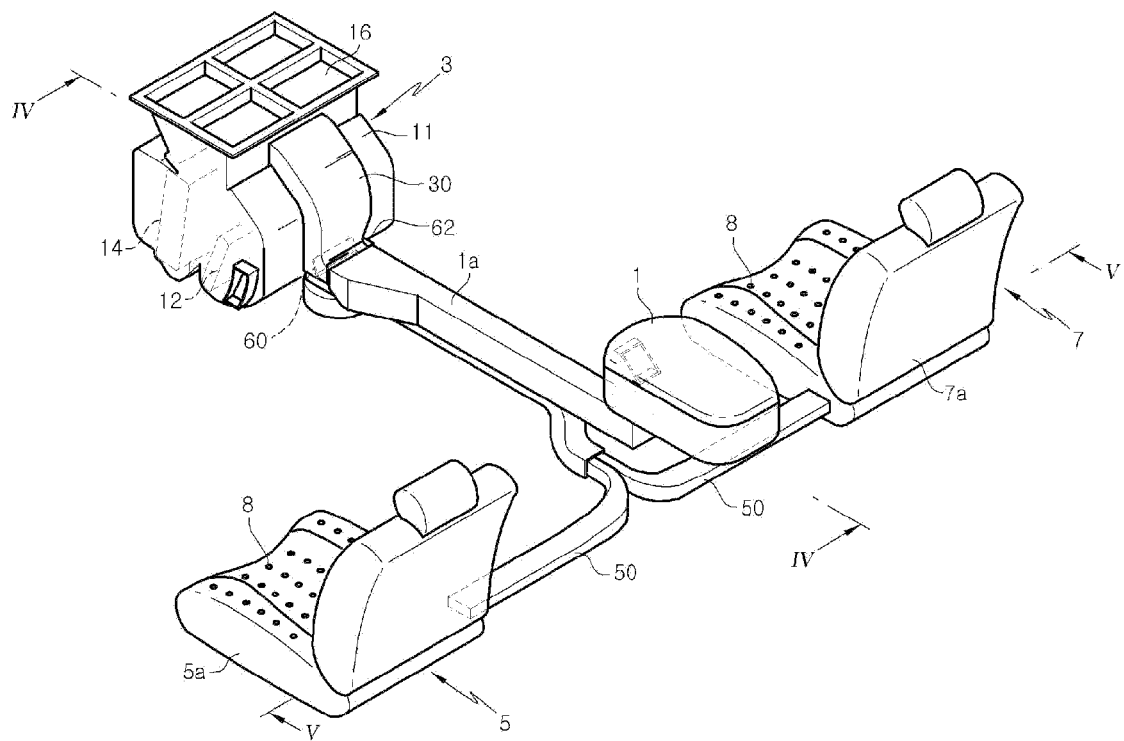
FIG. 4 is a assembled perspective view of the seat air-conditioning system shown in FIG. 3.

FIG. 3 is a bottom perspective view showing a characterizing part of an air conditioning system for automotive vehicles in accordance with the present invention. FIG. 4 is a section view taken along line IV-IV in FIG. 3.

Prior to describing the seat air-conditioning system of the present invention, brief description will be made on the general aspect of a vehicle air-conditioning system with reference to FIGS. 3 through 5.

The vehicle air-conditioning system includes an air-conditioning unit 3 provided with an air-conditioning case 11. The air-conditioning case 11 has an internal passage 11a. A heater core 12 and an evaporator 14 are installed within the internal passage 11a.

The heater core 12 serves to generate a hot air by heating the air present within the internal passage 11a of the air-conditioning case 11. The evaporator 14 functions to generate a cold air by cooling the air present within the internal passage 11a of the air-conditioning case 11.

The vehicle air-conditioning system includes a console air-conditioning system provided with a console duct 1a connected to a console box 1. The cold air or the hot air existing within the air-conditioning case 11 is supplied to the console box 1 through the console duct 1a, thereby cooling or heating the interior of the console box 1. This makes it possible for the console box 1 to serve as a refrigerator or a heating cabinet.

The cold air or the hot air may be blown to the rear passenger seats through the console duct 1a, thereby cooling or heating the rear passenger seats The vehicle air-conditioning system further includes a seat air-conditioning system having a plurality of air discharge holes 8 formed in the seat portions 5a and 7a of the driver seat 5 and the front passenger seat 7. The cold air or the hot air supplied from the air-conditioning unit 3 is discharged through the air discharge holes 8, consequently cooling or heating the driver seat 5 and the front passenger seat 7.

Next, certain features of the seat air-conditioning system will be described in detail with reference to FIGS. 3 through 6.

Figure 5:
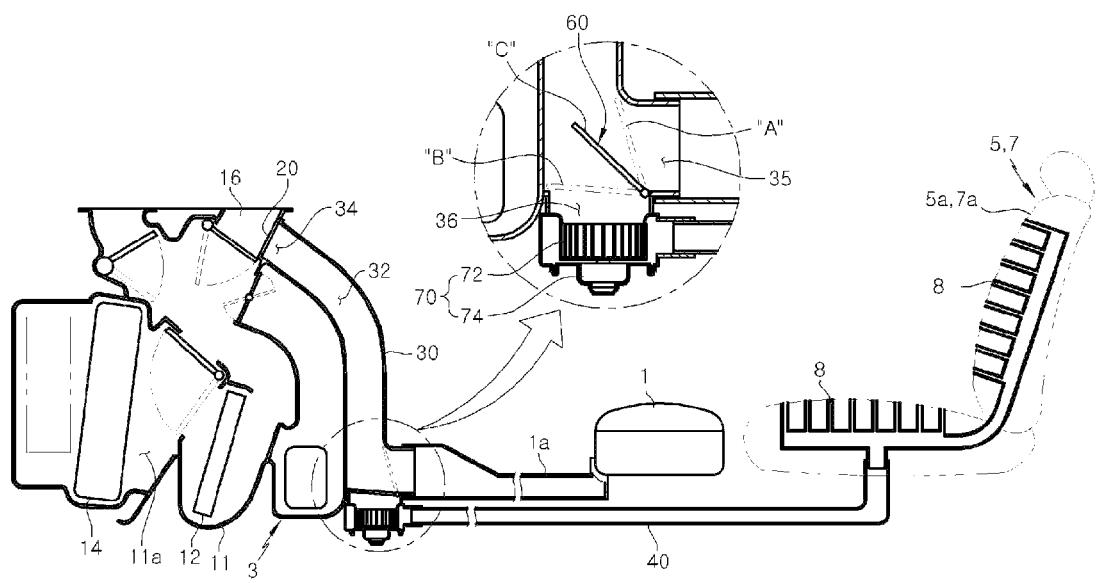
FIG. 5 is a section view of the seat air-conditioning system taken along line IV-IV in FIG. 4.

Referring first to FIGS. 3 through 5, the seat air-conditioning system includes an air outlet port 20 formed on one side of the air-conditioning case 11. The air outlet port 20 is formed downstream of a face vent 16. The cold air or the hot air flowing along the face vent 16 is partially diverted to the outside through the air outlet port 20.

The seat air-conditioning system further includes an outlet duct 30 through which the cold air or the hot air flowing out of the air outlet port 20 is fed to the rear side of the air-conditioning case 11. The outlet duct 30 is formed of a cover body partially covering the outer surface of the air-conditioning case 11. The outlet duct 30 cooperates with the outer surface of the air-conditioning case 11 to define an internal flow path 32 as between shown in FIG. 5.

The internal flow path 32 has one inlet mouth 34 and two outlet mouths 35 and 36. The inlet mouth 34 is connected to the air outlet port 20. Thus, the cold air or the hot air flowing out of the air outlet port 20 is introduced into the internal flow path 32 through the inlet mouth 34.

The cold air or the hot air flowing along the internal flow path 32 is divided into two streams and discharged through the outlet mouths 35 and 36. One of the outlet mouths 35 and 36 (hereinafter referred to as "first outlet mouth 35") is connected to the console duct 1a so that the cold air or the hot air flowing along the internal flow path 32 can be supplied to the console duct 1a. The cold air or the hot air supplied to the console duct 1a is introduced into the console box 1.

The other of the outlet mouths 35 and 36 (hereinafter referred to as "second outlet mouth 36") is connected to a seat duct 40. As can be seen in FIGS. 3 through 5, the seat duct 40 is arranged below the console duct 1a to extend toward between the driver seat 5 and the front passenger seat 7. The cold air or the hot air flowing along the outlet duct 30 is fed toward between the driver seat 5 and the front passenger seat 7 through the seat duct 40.

Figure 6:
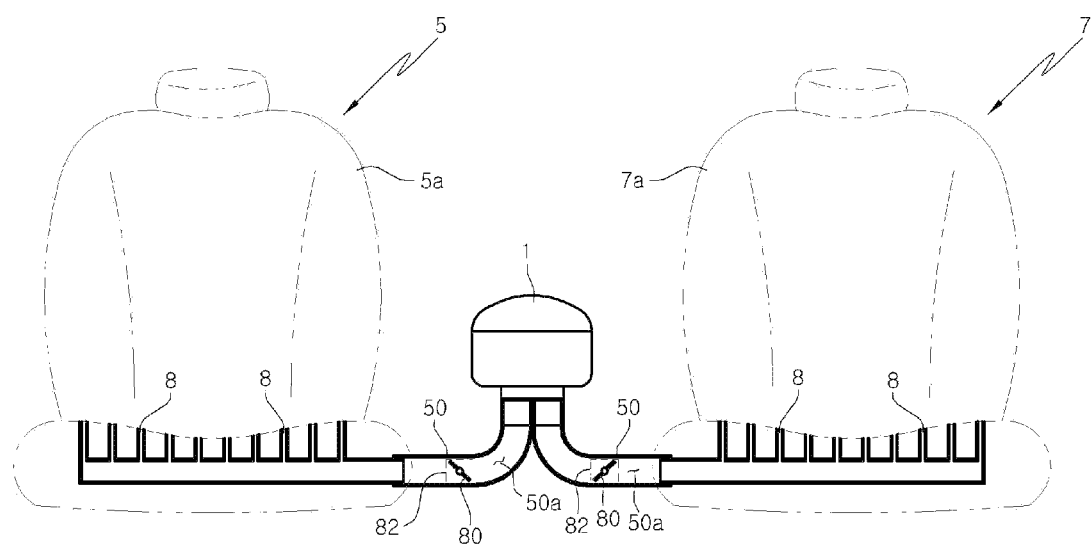
FIG. 6 is a section view of the seat air-conditioning system taken along line V-V in FIG. 4.

A pair of branch ducts 50 is connected to the rear end of the seat duct 40. Referring to FIGS. 3, 4 and 6, the branch ducts 50 are branched off from the seat duct 40 and connected to the seat portions 5a and 7a of the driver seat 5 and the front passenger seat 7, respectively. In other words, the branch ducts 50 are in communication with the air discharge holes 8 formed in the seat portions 5a and 7a.

The cold air or the hot air flowing through the internal flow path 40a of the seat duct 40 is supplied to the air discharge holes 8 of the seat portions 5a and 7a through the branch ducts 50. As a consequence, the cold air or the hot air is discharged to the outside from the air discharge holes 8 of the seat portions 5a and 7a, thereby cooling or heating the driver seat 5 and the front passenger seat 7.

Referring to FIG. 5, the seat air-conditioning system further includes a flow path switching door 60 rotatably attached to the branch point between the first outlet mouth 35 and the second outlet mouth 36.

The flow path switching door 60 is rotated by an actuator 62 between a first position A in which to close the first outlet mouth 35, a second position B in which to close the second outlet mouth 36 and a third position C in which to open the first outlet mouth 35 and the second outlet mouth 36 at the same time.

When in the first position A, the flow path switching door 60 closes the first outlet mouth 35 so that the cold air or the hot air existing within the outlet duct 30 can be supplied to only the seat duct 40 through the second outlet mouth 36. Thus, the cold air or the hot air is fed to the seat portions 5a and 7a of the driver seat 5 and the front passenger seat 7. At this time, only the seat air-conditioning system is in operation.

When in the second position B, the flow path switching door 60 closes the second outlet mouth 36 so that the cold air or the hot air existing within the outlet duct 30 can be supplied to only the console duct 1a through the first outlet mouth 35. Thus, the cold air or the hot air is fed to the console box 1. At this time, only the console air-conditioning system is in operation.

When in the third position C, the flow path switching door 60 simultaneously opens the first outlet mouth 35 and the second outlet mouth 36 so that the cold air or the hot air existing within the outlet duct 30 can be supplied to both the console duct 1a and the seat duct 40. Thus, the cold air or the hot air is simultaneously fed to the driver seat 5, the front passenger seat 7 and the console box 1. In this case, the console air-conditioning system and the seat air-conditioning system are operated at the same time.

Referring again to FIGS. 3 through 5, the seat air-conditioning system further includes a seat blower 70 mounted to the second outlet mouth 36 of the outlet duct 30.

The seat blower 70 includes a blower fan 72 and a blower motor 74 and is installed upright in the lower portion of the outlet duct 30. In other words, the seat blower 70 is arranged in the lower portion of the outlet duct 30 near the floor surface of a vehicle room so that it can be readily assembled and repaired within the vehicle room.

The seat blower 70 draws the cold air or the hot air from the second outlet mouth 36 and feeds it to the seat duct 40. This helps increase the flow rate of the cold air or the hot air supplied to the seat duct 40. Consequently, it becomes possible to greatly increase the flow rate of the cold air or the hot air fed to the seat portions 5a and 7a of the driver seat 5 and the front passenger seat 7. As a result, the cold air or the hot air discharged from the air discharge holes 8 of the seat portions 5a and 7a is kept at a high flow rate and at a high pressure. This makes it possible to sharply increase the cooling or heating performance of the seat portions 5a and 7a.

The seat blower 70 is configured to operate only when the flow path switching door 60 opens the second outlet mouth 36. The seat blower 70 may be removably attached to the seat duct 40 or may be integrally formed with the seat duct 40, if necessary.

Referring to FIG. 6, the seat air-conditioning system further includes throttle doors 80 installed within the branch ducts 50. The throttle doors 80 are arranged in the internal flow paths 50a of the branch ducts 50 and are rotated by an actuator 82 to control the opening degree of each of the internal flow paths 50a of the branch ducts 50. Since the throttle doors 80 are designed to independently control the flow rate of the cold air or the hot air supplied to the seat portions 5a and 7a of the driver seat 5 and the front passenger seat 7, it is possible to cool or heat the driver seat 5 and the front passenger seat 7 independently of each other. This makes it possible to selectively cool or heat one of the driver seat 5 and the front passenger seat 7. For example, if the front passenger seat 7 remains empty, it is possible to cut off the cold air or the hot air supplied to the front passenger seat 7. This helps prevent unnecessary consumption of the cold air or the hot air, thereby maximizing the seat cooling or heating performance.

With the seat air-conditioning system of this configuration, the cold air or the hot air is drawn from the air-conditioning unit 3 through the outlet duct 30 attached to the air-conditioning case 11 and is used to cool or heat the seat portions 5a and 7a. This makes the assembling structure simpler, thereby making it possible to install the seat air-conditioning system through a simplified assembling process and in a cost-effective manner.

Figure 2:
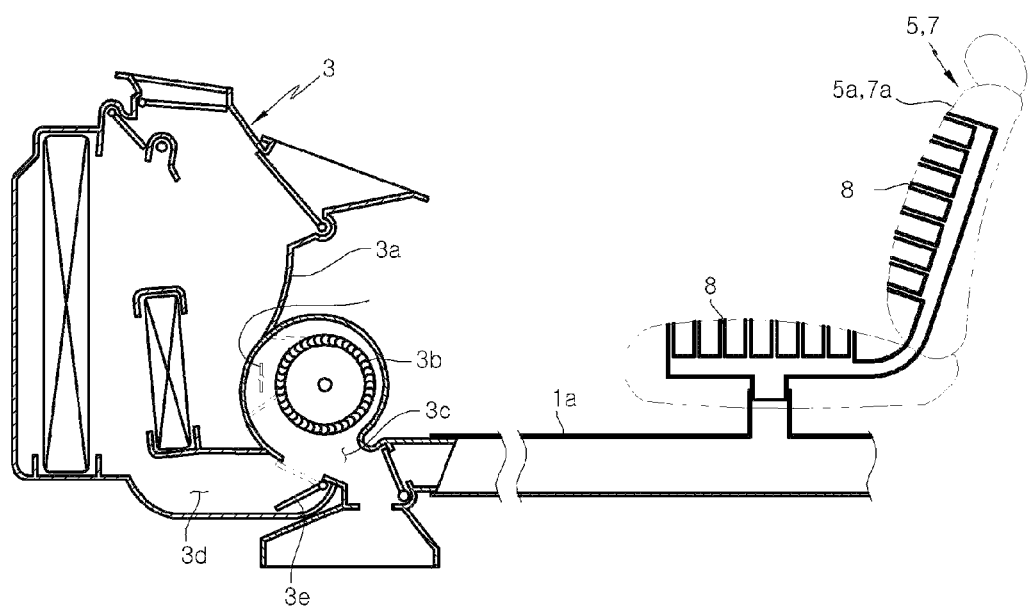

Since the seat air-conditioning system is designed to cool or heat the seat portions 5a and 7a by feeding the cold air or the hot air through the outlet duct 30 additionally attached to the air-conditioning case 11, it is possible to cool or heat the seat portions 5a and 7a without having to use the seat air passage 3d of the prior art air-conditioning system formed within the air-conditioning case 3a (see FIG. 2).

Accordingly, there is no need to integrally form the seat air passage 3d within the air-conditioning unit 3. This makes it possible to fabricate the air-conditioning unit 3 for an air-conditioning system having a seat cooling or heating function in the same structure as the air-conditioning unit 3 for an air-conditioning system having no seat cooling or heating function. Therefore, the air-conditioning unit 3 for an air-conditioning system having a seat cooling or heating function can be interchangeably used with the air-conditioning unit 3 for an air-conditioning system having no seat cooling or heating function. As a result, it is possible to increase the shared use ratio of parts between different air-conditioning systems, eventually providing a cost saving effect.

In the seat air-conditioning system of the present invention, the flow rate of the cold air or the hot air supplied to the seat portions 5a and 7a is increased by use of the seat blower 70 mounted to the outlet duct 30. Unlike the prior art (see FIG. 2), it is possible to increase the flow rate of the cold air or the hot air without having to use the auxiliary blower 3b integrally installed within the air-conditioning unit 3a.

This makes it possible to fabricate the air-conditioning unit 3 for an air-conditioning system having a seat cooling or heating function in the same structure as the air-conditioning unit 3 for an air-conditioning system having no seat cooling or heating function. Therefore, the air-conditioning unit 3 for an air-conditioning system having a seat cooling or heating function can be interchangeably used with the air-conditioning unit 3 for an air-conditioning system having no seat cooling or heating function. As a result, it is possible to increase the shared use ratio of parts between different air-conditioning systems, eventually providing a cost saving effect.

In the seat air-conditioning system of the present invention, the cold air or the hot air is directly fed to the driver seat 5 and the front passenger seat 7, which makes it possible to supply the cold air or the hot air to the driver seat 5 and the front passenger seat 7 at an increased flow rate. Accordingly, there is provided an effect of sharply increasing the seat cooling or heating performance.

Second Embodiment

Figure 7:
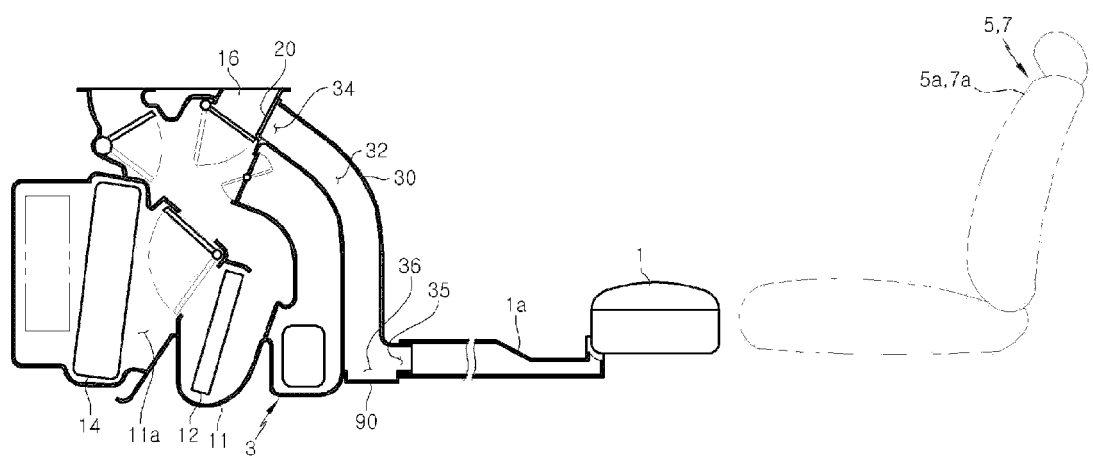
FIG. 7 is a section view showing a seat air-conditioning system for automotive vehicles in accordance with a second embodiment of the present invention.

Referring to FIG. 7, there is shown a seat air-conditioning system in accordance with a second embodiment of the present invention.

The seat air-conditioning system of the second embodiment includes an outlet duct 30 through which to draw the cold air or the hot air from the air-conditioning case 11. The second outlet mouth 36 of the outlet duct 30 is closed in this seat air-conditioning system. This makes it possible to omit the seat blower 70 otherwise mounted to the second outlet mouth 36. The outlet duct 30 having the closed second outlet mouth 36 is used in an air-conditioning system in which the cold air or the hot air need not be discharged through the second outlet mouth 36, namely an air-conditioning system having no seat cooling or heating performance.

According to the second embodiment, an air-conditioning system having no seat cooling or heating function can be manufactured by merely using the outlet duct 30 with the closed second outlet mouth 36. This means that an air-conditioning system having no seat cooling or heating function and an air-conditioning system having a seat cooling or heating function can be readily manufactured with no change in design or part. This helps provide a cost saving effect.

The second outlet mouth 36 of the outlet duct 30 is closed by an independent closing member 90. If necessary, the second outlet mouth 36 may be formed in a closed state when producing the outlet duct 30. It is preferred that the second outlet mouth 36 is closed by the closing member 90. The reason is that use of the closing member 90 allows a user to close or open the second outlet mouth 36 at his or her discretion, thereby making it possible to easily realize an outlet duct with a closed second outlet mouth and an outlet duct with an open second outlet mouth.

As a result, there is no need to separately produce both the outlet duct for an air-conditioning system having no seat cooling or heating function and the outlet duct for an air-conditioning system having a seat cooling or heating function. This helps minimize the manufacturing cost of parts.

Third Embodiment

Figure 8:
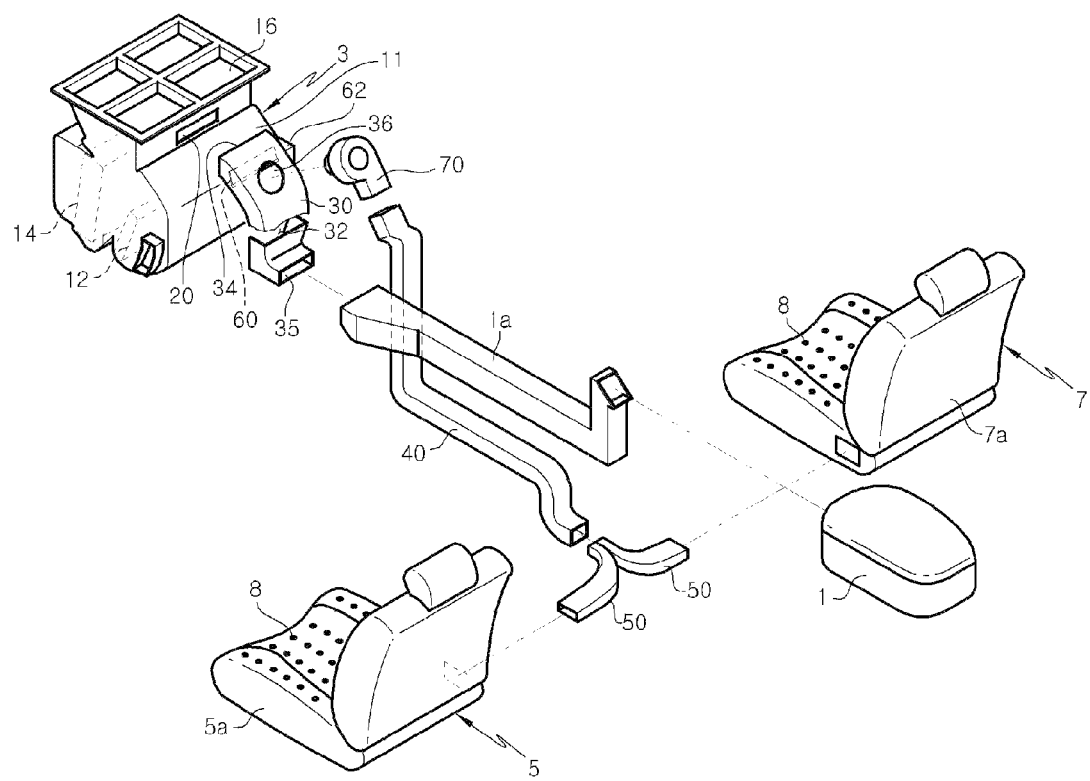
FIGS. 8 and 9 are exploded perspective and section views showing a seat air-conditioning system for automotive vehicles in accordance with a third embodiment of the present invention.
Figure 9:
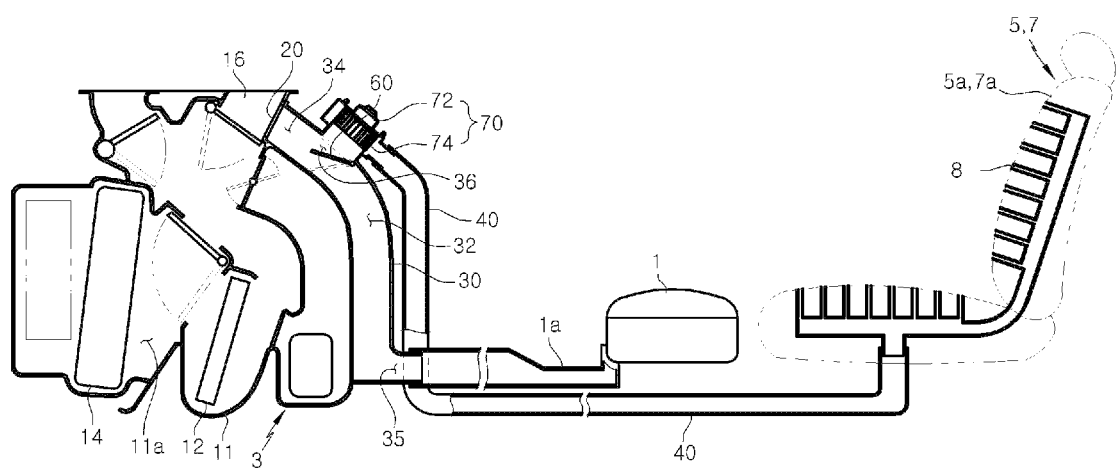

Referring to FIGS. 8 and 9, there is shown a seat air-conditioning system in accordance with a third embodiment of the present invention.

In the seat air-conditioning system of the third embodiment, the second outlet mouth 36 is formed in the upper portion of the outlet duct 30, the seat blower 70 being mounted to the second outlet mouth 36. Forming the second outlet mouth 36 in the upper portion of the outlet duct 30 makes it possible to arrange the seat blower 70 in the wide space above the air-conditioning case 11.

As compared with the seat air-conditioning system of the first embodiment in which the seat blower 70 is arranged in the narrow space below the air-conditioning case 11, it is easy and convenient to attach and remove the seat blower 70. This helps increase the degree of freedom of design and enhance the ease of repair and maintenance.

It is preferred that the seat blower 70 is mounted to the upper surface portion of the air-conditioning case 11 to face toward the vehicle room. This is to ensure that the seat blower 70 can be easily attached or removed within the vehicle room, eventually further enhancing the ease of repair and maintenance.

Fourth Embodiment

Figure 10:
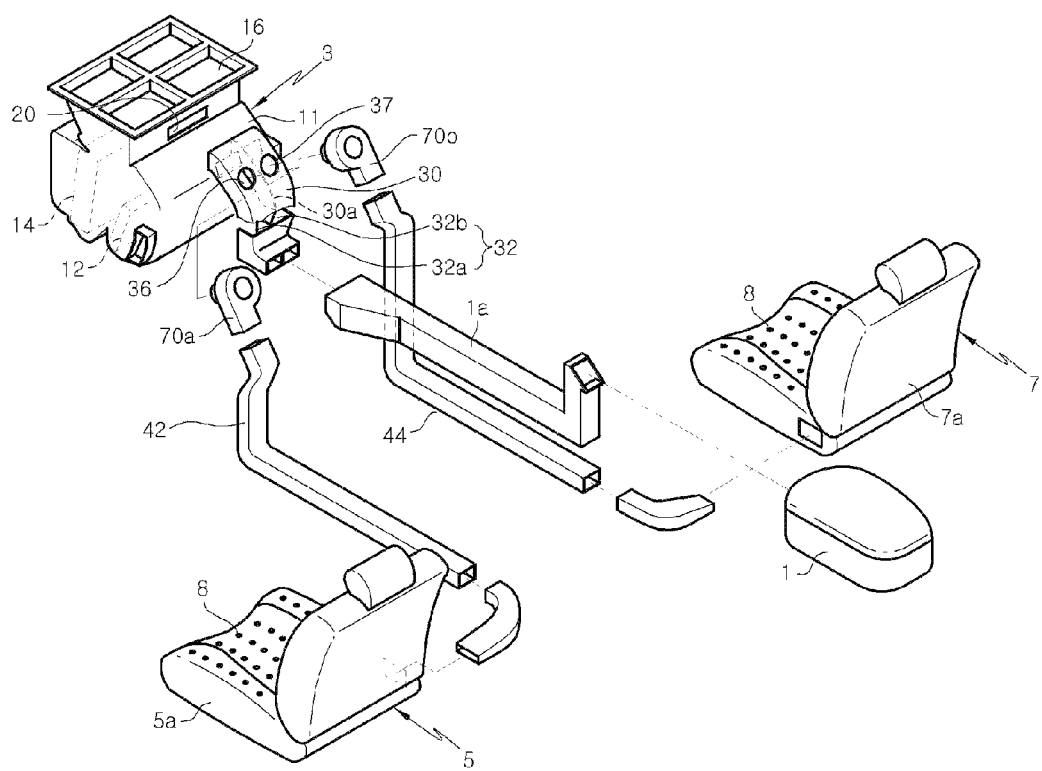
FIGS. 10 and 11 are exploded perspective and section views showing a seat air-conditioning system for automotive vehicles in accordance with a fourth embodiment of the present invention.
Figure 11:
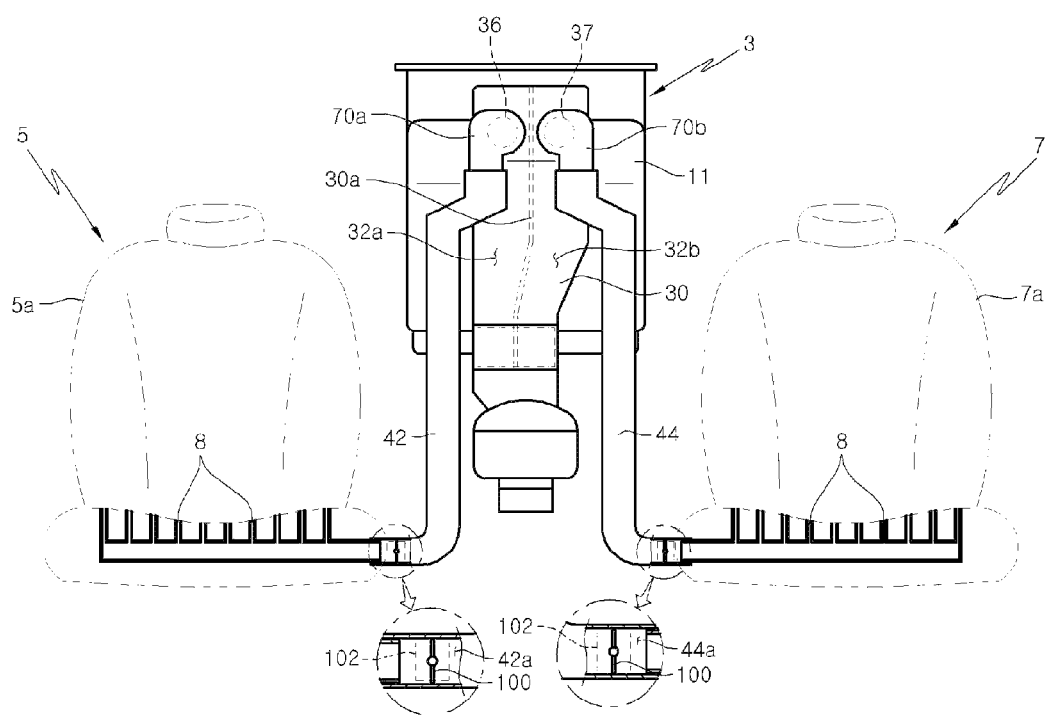

Referring to FIGS. 10 and 11, there is shown a seat air-conditioning system in accordance with a fourth embodiment of the present invention.

In the seat air-conditioning system of the fourth embodiment, a partition plate 30a is installed within the internal flow path 32 of the outlet duct 30 to divide the internal flow path 32 into a left flow path portion 32a and a right flow path portion 32b. A second outlet mouth 36 is formed in the left flow path portion 32a, while a third outlet mouth 37 formed in the right flow path portion 32b.

A driver seat duct 42 is connected to the second outlet mouth 36 of the left flow path portion 32a. A passenger seat duct 44 is connected to the third outlet mouth 37 of the right flow path portion 32b. The cold air or the hot air flowing out of the second outlet mouth 36 is blown toward the seat portion 5a of the driver seat 5, particularly toward the air discharge holes 8 of the seat portion 5a, through the driver seat duct 42. Thus, the cold air or the hot air is discharged from the air discharge holes 8 of the seat portion 5a to cool or heat the driver seat 5. The cold air or the hot air flowing out of the third outlet mouth 37 is blown toward the seat portion 7a of the front passenger seat 7, particularly toward the air discharge holes 8 of the seat portion 7a, through the passenger seat duct 44. Thus, the cold air or the hot air is discharged from the air discharge holes 8 of the seat portion 7a to cool or heat the front passenger seat 7.

The seat air-conditioning system of the fourth embodiment includes a driver seat blower 70a mounted to the second outlet mouth 36 and a passenger seat blower 70b mounted to the third outlet mouth 37.

The driver seat blower 70a draws the cold air or the hot air from the second outlet mouth 36 and blows it into the driver seat duct 42, thereby increasing the flow rate of the cold air or the hot air fed to the driver seat duct 42 and then to the seat portion 5a of the driver seat 5. As a consequence, the cold air or the hot air discharged from the seat portion 5a of the driver seat 5 is kept at a high flow rate and at a high pressure. This helps enhance the cooling or heating performance for the driver seat 5.

The passenger seat blower 70b draws the cold air or the hot air from the third outlet mouth 37 and blows it into the passenger seat duct 44, thereby increasing the flow rate of the cold air or the hot air fed to the passenger seat duct 44 and then to the seat portion 7a of the front passenger seat 7. As a consequence, the cold air or the hot air discharged from the seat portion 7a of the front passenger seat 7 is kept at a high flow rate and at a high pressure. This helps enhance the cooling or heating performance for the front passenger seat 7.

As can be seen in FIG. 11, the seat air-conditioning system of the fourth embodiment further includes throttle doors 100 installed in the driver seat duct 42 and the passenger seat duct 44.

The throttle doors 100 are arranged within the internal flow paths 42a and 44a of the driver seat duct 42 and the passenger seat duct 44 and are rotated by actuators 102 to control the opening degrees of the internal flow paths 42a and 44a. Thus, the flow rates of the cold air or the hot air supplied to the seat portions 5a and 7a of the driver seat 5 and the front passenger seat 7 can be can be controlled independently of each other. This makes it possible to independently cool or heat the driver seat 5 and the front passenger seat 7.

With the seat air-conditioning system of the fourth embodiment, the moving route of the cold air or the hot air supplied from the air-conditioning unit 3 to the driver seat 5 differs from the moving route of the cold air or the hot air supplied from the air-conditioning unit 3 to the front passenger seat 7. This makes it possible to independently cool or heat the driver seat 5 and the front passenger seat 7, thereby maximizing the cooling or heating performance for the driver seat 5 and the front passenger seat 7.

Since the seat air-conditioning system of the fourth embodiment is configured to increase the flow rates of the cold air or the hot air supplied to the driver seat 5 and the front passenger seat 7, it is possible to pleasantly cool or heat the driver seat 5 and the front passenger seat 7 with no shortage in the flow rate of the cold air or the hot air.

Inasmuch as the flow rates of the cold air or the hot air supplied to the driver seat 5 and the front passenger seat 7 are independently controlled, it is possible to selectively cool or heat one of the driver seat 5 and the front passenger seat 7. This helps prevent unnecessary consumption of the cold air or the hot air.

The seat air-conditioning system shown in FIGS. 10 and 11 is applicable to a left hand drive (LHD) type vehicle having a steering wheel at the left side. The driver seat 5 is arranged in the left section of the drawings and the front passenger seat 7 in the right section. The respective parts are named on this basis. For example, reference character 5 designates the driver seat, reference character 7 designating the front passenger seat, reference character 42 designating the driver seat duct, reference character 44 designating the passenger seat duct, reference character 70a designating the driver seat blower and reference character 70b designating the passenger seat blower.

In case where the seat air-conditioning system is applied to a right hand drive (RHD) type vehicle having a steering wheel at the right side, the driver seat 5 is to be arranged in the right section of the drawings and the front passenger seat 7 in the left section. In this case, the reference characters designating the respective parts may well be changed accordingly.

Fifth Embodiment

Figure 12:
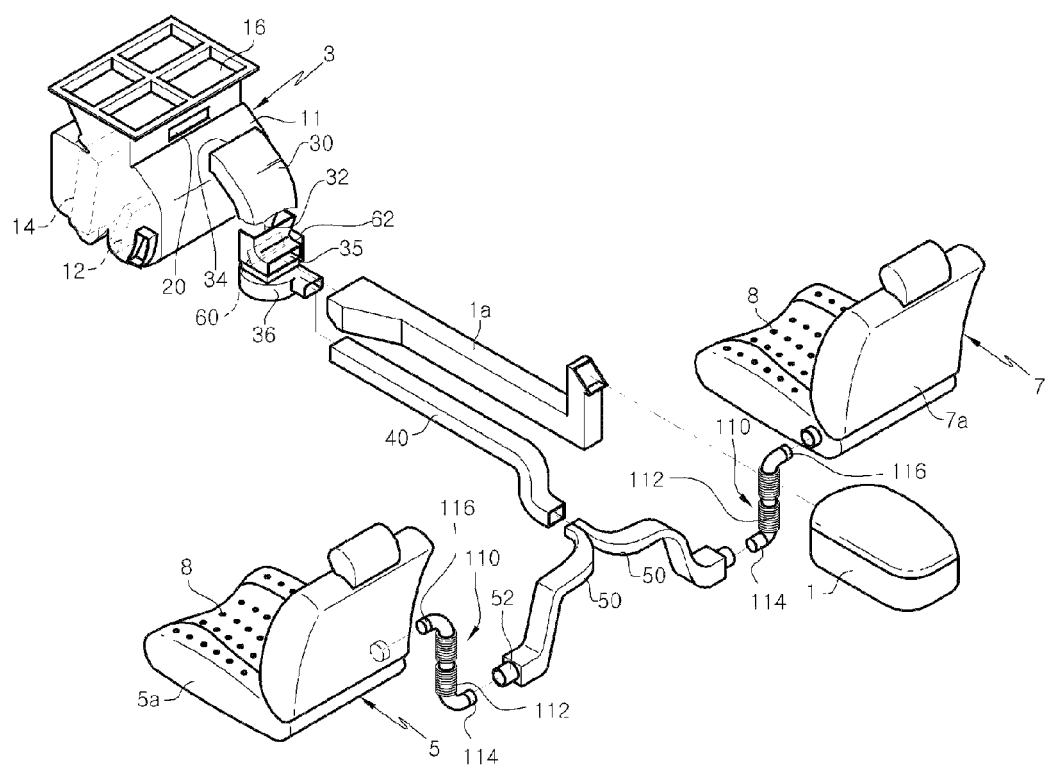
FIG. 12 is an exploded perspective view showing a seat air-conditioning system for automotive vehicles in accordance with a fifth embodiment of the present invention.
Figure 13A:
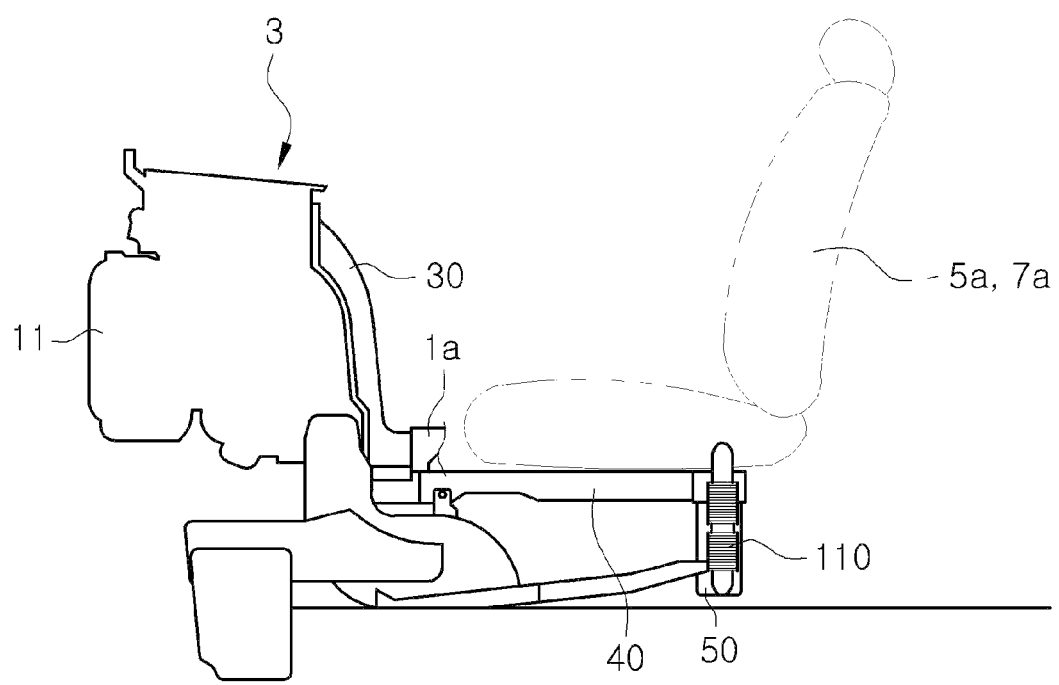
FIGS. 13A and 13B are views illustrating the operation examples of the seat air-conditioning system shown in FIG. 12.
Figure 13B:
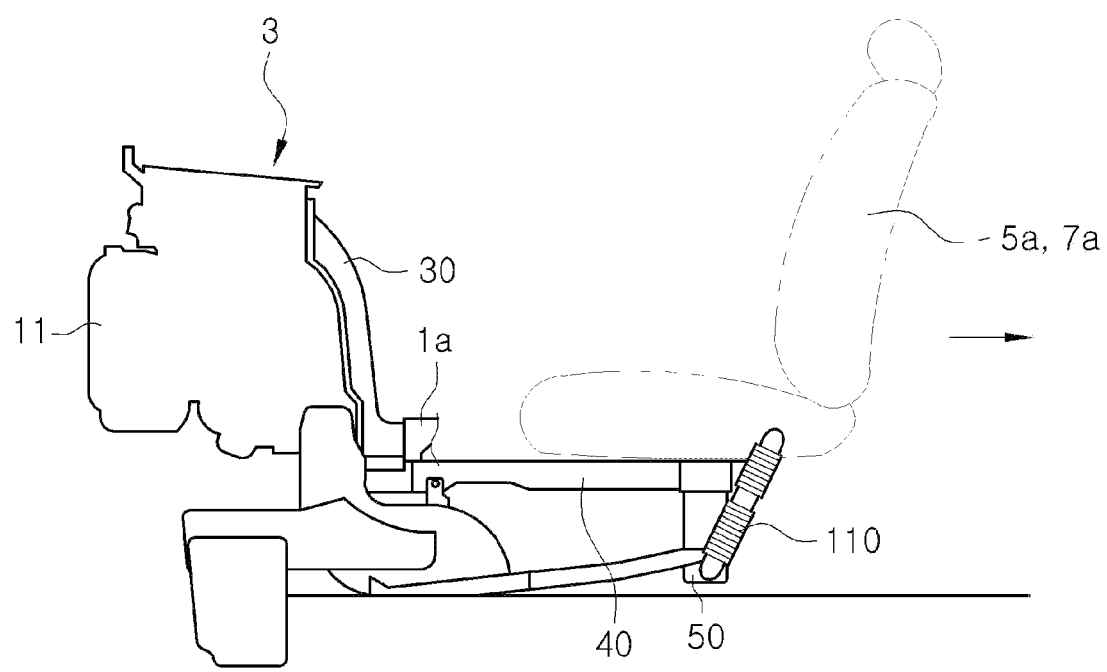
Figure 14:
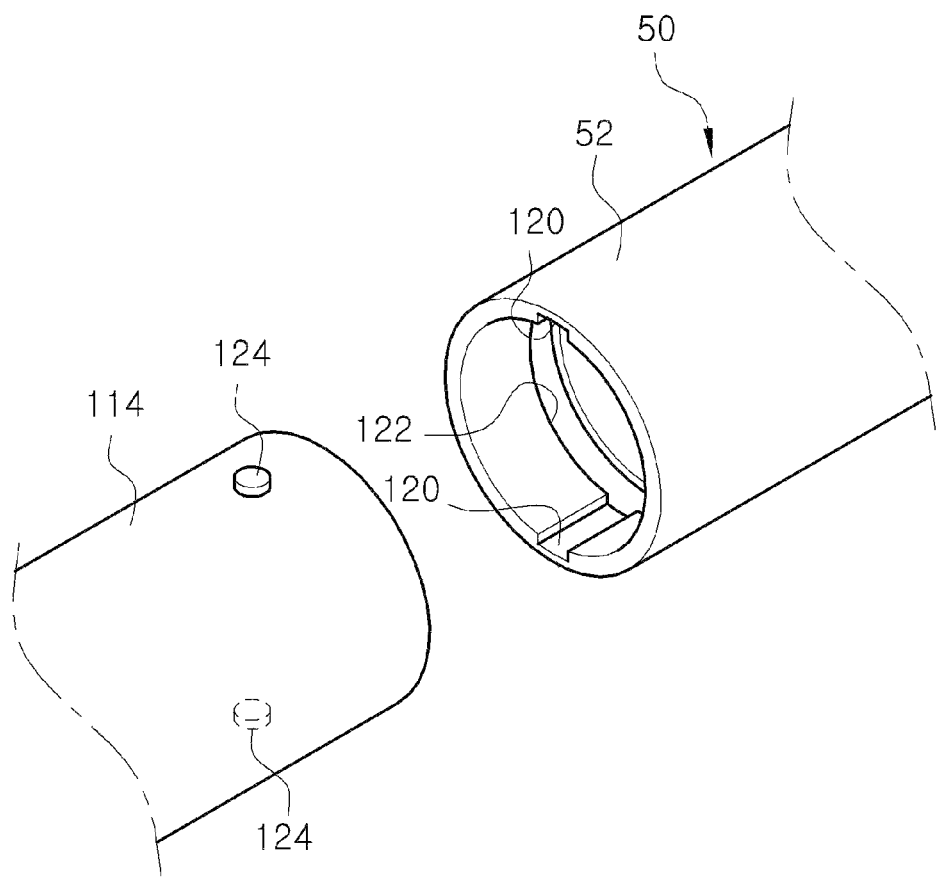
FIG. 14 is a perspective view illustrating a flexible duct, a branch duct and a coupling unit for rotatably coupling the flexible duct and branch duct together, all of which are employed in the seat air-conditioning system of the fifth embodiment.

Referring to FIGS. 12 through 14, there is shown a seat air-conditioning system in accordance with a fifth embodiment of the present invention.

As shown in FIG. 12, the seat air-conditioning system of the fifth embodiment is configured so that the distal end portions 52 of the branch ducts 50 can extend toward the floor surface of the vehicle room. The distal end portions 52 of the branch ducts 50 are positioned lower than the seat portions 5a and 7a of the driver seat 5 and the front passenger seat 7.

The seat air-conditioning system of the fifth embodiment includes flexible ducts 110 for interconnecting the distal end portions 52 of the branch ducts 50 and the seat portions 5a and 7a. Each of the flexible ducts 110 includes a duct body 112, a duct inlet portion 114 and a duct outlet portion 116.

The duct body 112 is formed into a bellows shape so that it can be deformed in the longitudinal direction and can be bent to all directions, i.e., to the left, right, upper and lower directions. The duct inlet portion 114 is connected to each of the distal end portions 52 of the branch ducts 50 so that the cold air or the hot air flowing along each of the branch ducts 50 can be introduced into the duct body 112 through the duct inlet portion 114. The duct outlet portion 116 is connected to each of the seat portions 5a and 7a so that the cold air or the hot air can be fed to each of the seat portions 5a and 7a.

Since the flexible ducts 110 can be deformed in the longitudinal direction and in the left, right, upper and lower directions, the seat portions 5a and 7a are allowed to move even when the branch ducts 50 are connected to the seat portions 5a and 7a.

As illustrated in FIGS. 13a and 13b, the flexible ducts 110 are retracted and extended when the driver seat 5 and the front passenger seat 7 are moved in the back-and-forth direction and in the up-and-down direction in order to adjust the positions of the driver seat 5 and the front passenger seat 7. Therefore, the flexible ducts 110 allow the driver seat 5 and the front passenger seat 7 to move in the back-and-forth direction and in the up-and-down direction.

Referring to FIGS. 12 and 14, the duct inlet portion 114 of the flexible ducts 110 is rotatably coupled to each of the distal end portions 52 by a coupling unit. Likewise, the duct outlet portion 116 of the flexible ducts 110 is rotatably coupled to each of the seat portions 5a and 7a by a coupling unit. As can be seen in FIG. 14, the coupling unit for coupling the duct inlet portion 114 and each of the branch ducts 50 together is of a pin-and-groove type by which the flexible ducts 110 can be rotated with respect to the branch ducts 50 when the duct inlet portion 114 is coupled to each of the distal end portions 52 of the branch ducts 50. The coupling unit may be realized in many different forms other than shown in FIG. 14.

Two mutually-opposing insertion grooves 120 are formed on the inner circumferential surface of each of the distal end portions 52 to extend in the longitudinal direction of the branch ducts 50. A rotation groove 122 is formed on the inner circumferential surface of each of the branch ducts 50 to extend in the circumferential direction of the branch ducts 50. The rotation groove 122 is connected to the insertion grooves 120.

Two coupling pins 124 are formed on the outer circumferential surface of the duct inlet portion 114 in a corresponding relationship with the insertion grooves 120. When the duct inlet portion 114 is inserted into each of the branch ducts 50, the coupling pins 124 are slid along the insertion grooves 120. If the coupling pins 124 reach the rotation groove 122, they can move along the rotation groove 122 in the circumferential direction. Thus, the duct inlet portion 114 can rotate with respect to each of the distal end portions 52 of the branch ducts 50 at a desired angle. As a result, the duct inlet portion 114 of each of the flexible ducts 110 is coupled to each of the branch ducts 50 in a mutually rotatable manner. The number of the insertion grooves 120 and the coupling pins 124 is not limited to two but may be changed to other numbers.

The coupling unit for coupling the duct outlet portion 116 and each of the seat portions 5a and 7a together has the same structure as the coupling unit for coupling the duct inlet portion 114 and each of the branch ducts 50 together. Therefore, the coupling unit for coupling the duct outlet portion 116 and each of the seat portions 5a and 7a together will be omitted from description and illustration.

Since the opposite end portions of the flexible ducts 110 are coupled to the counterpart members for clockwise and counterclockwise rotation, the flexible ducts 110 are prevented from being damaged during movement of the driver seat 5 or the front passenger seat 7.

While certain preferred embodiments of the invention have been described hereinabove, the present invention is not limited to these embodiments. It is to be understood that various changes and modifications may be made without departing from the scope of the invention defined in the claims.

What is claimed is:

1. A seat air-conditioning system for automotive vehicles, comprising:
    an air-conditioning unit for generating a cold air or a hot air;
    a driver seat including a seat portion provided with a plurality of air discharge holes through which to discharge the cold air or the hot air to the outside;
    a front passenger seat including a seat portion provided with a plurality of air discharge holes through which to discharge the cold air or the hot air to the outside;
    a console box or rear passenger seats;
    an outlet duct mounted to the air-conditioning unit for drawing the cold air or the hot air from the air-conditioning unit therethrough, the outlet duct defining a lateral outlet port and a bottom outlet port below the lateral outlet port;
    a console duct connected to the lateral outlet port of the outlet duct for supplying the cold air or the hot air to the console box or the rear passenger seats, the console duct being coupled to the console box or the rear passenger seats;
    a seat blower attached to the bottom outlet port of the outlet duct for blowing the cold air or the hot air at an increased flow rate;
    a seat duct connected to the seat blower for supplying the cold air or the hot air to the driver seat and the front passenger seat therethrough, the seat duct being coupled to the driver seat and the front passenger seat, the seat duct being located below the console duct;
    a flow path switching door installed at a branch point in the outlet duct between the lateral outlet port and the bottom outlet port for opening one or both of the lateral outlet port and the bottom outlet port, the flow path switching door being rotatable between a first position in which to close the lateral outlet port, a second position in which to close the bottom outlet port, and a third position in which to open the bottom outlet port and the lateral outlet port; and
    wherein the seat blower is arranged upright in a lower portion of the outlet duct near a floor surface of a vehicle room and narrow space below the air conditioning unit.

2. The seat air-conditioning system according to claim 1, said flow path switching door further comprising a closing member for selectively closing the bottom outlet port.

3. The seat air-conditioning system according to claim 1, wherein the seat blower is removably mounted to the seat duct.

4. The seat air-conditioning system according to claim 1, wherein the seat blower is integrally formed with the seat duct.

5. The seat air-conditioning system according to claim 1, further comprising:
    a pair of branch ducts through which the cold air or the hot air is supplied from the seat duct to the seat portion of the driver seat and the seat portion of the front passenger seat; and
    a pair of flexible ducts for connecting the branch ducts to the seat portion of the driver seat and the seat portion of the front passenger seat.

6. The seat air-conditioning system according to claim 5, further comprising: coupling units for rotatably coupling the flexible ducts to the branch ducts and for rotatably coupling the flexible ducts to the seat portion of the driver seat and the seat portion of the front passenger seat.

7. The seat air-conditioning system according to claim 6, wherein each of the coupling units includes: longitudinal insertion grooves formed on the inner circumferential surfaces of the branch ducts and the seat portions of the driver seat and the front passenger seat; circumferential rotation grooves formed on the inner circumferential surfaces of the branch ducts and the seat portions of the driver seat and the front passenger seat, each of the circumferential rotation grooves being connected to each of the longitudinal insertion grooves; and coupling pins protruding from the flexible ducts in a corresponding relationship with the longitudinal insertion grooves, each of the coupling pins being inserted into the circumferential rotation grooves through the longitudinal insertion grooves for movement along the circumferential rotation grooves.

* * * * *